(12) United States Patent
Gordeyev

(10) Patent No.: US 7,333,837 B2
(45) Date of Patent: Feb. 19, 2008

(54) UNIVERSAL HANDS-FREE UNIT FOR MOBILE TELEPHONES

(75) Inventor: Dmitry Mikhailovich Gordeyev, Saint-Petersburg (RU)

(73) Assignee: ZAO "Premier Technology", St. Petersburg (RU)

( * ) Notice: Subject to any disclaimer, the term of this patent is extended or adjusted under 35 U.S.C. 154(b) by 525 days.

(21) Appl. No.: 11/057,674

(22) Filed: Feb. 14, 2005

(65) Prior Publication Data

US 2006/0014571 A1    Jan. 19, 2006

(30) Foreign Application Priority Data

Jul. 16, 2004    (RU)    ............................ 2004121863

(51) Int. Cl.
  *H04M 1/00*    (2006.01)
(52) U.S. Cl. ................. 455/569.2; 455/569.1; 455/99; 455/345; 455/350; 379/420.01; 379/420.02; 379/420.03; 379/420.04
(58) Field of Classification Search ............ 455/569.1, 455/569.2, 99, 345, 350; 379/420.01, 420.02, 379/420.03, 420.04; D14/140
  See application file for complete search history.

(56) References Cited

U.S. PATENT DOCUMENTS

| 6,138,041 | A  |    | 10/2000 | Yahia |           |
|-----------|----|----|---------|-------|-----------|
| 6,349,223 | B1 |    | 2/2002  | Chen  |           |
| 6,377,825 | B1 |    | 4/2002  | Kennedy et al. | |
| 6,687,516 | B2 | *  | 2/2004  | Chen  | 455/569.1 |
| 6,762,585 | B2 | *  | 7/2004  | Liao  | 320/107   |
| 6,951,480 | B2 | *  | 10/2005 | Rivera | 439/568  |
| 6,980,836 | B1 | *  | 12/2005 | Skiles | 455/569.2 |
| 7,062,300 | B1 | *  | 6/2006  | Kim   | 455/569.1 |

* cited by examiner

*Primary Examiner*—Nay Maung
*Assistant Examiner*—Richard Chan
(74) *Attorney, Agent, or Firm*—Houston Eliseeva LLP

(57) ABSTRACT

The invention pertains to mobile telephones and can be used during telephone conversations while, for example, operating a mode of transportation. The universal hands-free unit for mobile telephones contains the main module containing a speaker and control electronics, a holder for the mobile telephone, a microphone, an attachment module, and a changeable connection module for electrical connection of the control electronics with the electrical circuits of the mobile telephone. The holder of the mobile telephone is constructed in the form of two plates oriented parallel to each other at a distance L which may be changed by moving at least one plate relative to the other plate with the help of a mechanism located in the body of the main module. A fixating bracket attached to each holding plate, each fixating bracket is made in the shape of a base with several parallel resilient fins.

3 Claims, 5 Drawing Sheets

VIEW A
ROTATED

UNIVERSAL HANDS-FREE UNIT FOR MOBILE TELEPHONES

CROSS-REFERENCE TO RELATED APPLICATIONS

This application claims priority to Russian Application Ser. No. RU2004121863, filed Jul. 16, 2004, which is incorporated by reference herein in its entirety.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable.

BACKGROUND OF THE INVENTION

The invention pertains to mobile telephones and may be used during telephone conversations while, for example, operating a road vehicle.

In recent years, progress in the communications industry has led to the appearance and wide-spread use of mobile reception units, in particular, mobile telephones or cell phones. At the present time, a large number of cell phone manufacturers offer a wide variety of models, which differ from each other in functional capabilities, size, and design. Mobile reception opens up new possibilities of communication for the customer, and, on the other hand, requires them to follow certain rules, insuring the safety of any surrounding people. The primary aspect of these rules focuses on restricting the use of mobile connection while operating a road vehicle. Many countries have enacted laws and regulations regulating the use of cell phones by drivers of automobiles. The manufacturers of mobile telephones offer the customers special devices, called "car kits", "speaker phones", or "hands-free" devices or units including a microphone, speaker, and an electronic system for the switching of electronic signals at the output of the mobile telephone.

With the help of these devices, the drivers can safely talk on the cell phone while in a moving automobile, without being distracted from operating the vehicle, and without removing their hands from the steering wheel. The leading cell phone manufacturers are releasing specialized hands-free units, designed specially for use with hardware released by the same manufacturer. For example, the car kit CARK-132 (Technical Manual, Issue 1.0 09/01 N 0275517, Nokia Corporation), composed of a power unit and a control unit, to which the speaker, microphone and mobile phone holder are attached by cables. One disadvantage of this device is that it is adapted to work only with cell phones produced by Nokia and is not compatible with telephones of other manufacturers. If a user acquires a cell phone of another make or model, the specialized hands-free unit, previously installed in the automobile and designed for use with a cell phone of a specific model or a certain manufacturer, requires replacement. Therefore, this constructional and functional feature of the CARK-132 device, the lack of opportunity to adapt it to cell phones of different makes and models, is an obvious drawback.

In order for a hands-free unit to be comfortable to use and compatible with various models of cell phones, it is necessary to fulfill at least two requirements: first, the electronic scheme of the device must be compatible with the different output interfaces of cell phones of different manufacturers, and second, the hands-free unit must guarantee the safe positioning and fixation of the mobile telephone, taking into account the varying sizes and shapes of the body of the mobile telephone.

The first problem is solved by the use of interchangeable connectors linking the input and output of the electronics of the hands-free unit with the output and input of the electronics of the mobile telephone. The second problem is usually solved by the use of the mobile phone holders that are either adapted to the shape and design of the mobile phone (see the U.S. Pat. No. 6,138,041 which is incorporated herein by reference in its entirety or U.S. Pat. No. 6,377,825 which is incorporated herein by reference in its entirety) or contain adjustable holding units that can secure the body of the mobile phone in the holder.

In certain models of hands-free units, a compromise usually is strived for between the ease and simplicity of positioning and installing the mobile telephone in the holder and the reliability of its fixation, taking into account the vibrations during the movement of the vehicle. The easier it is to set up the mobile phone in the holder and to remove it from therein, the less reliable its fixation and the higher the chances of its slipping out of the holder and falling to the floor of the car while it is moving.

The closest to the present invention and chosen as a prototype is the universal hands-free unit for mobile telephones shown in FIG. 1 of the U.S. Pat. No. 6,349,223 which is incorporated herein by reference in its entirety. That device consists of a main module, in the body of which a speaker and an electronic control unit are placed, as well as a holder for the mobile telephone, a microphone, an attachment module and a changeable connection module for electrical connection of the electronic control unit with the electrical circuits of the mobile telephone. The holder of the mobile telephone is constructed in the form of two plates, oriented parallel to each other at a distance no less than the width of the mobile telephone, with the possibility to change this distance by moving at least one plate relative to the other plate with the help of a mechanism located in the body of the main module. The module has a shape elongated along the axis of the mobile telephone, and a frontal surface with a flat area next to the attachment point of the mobile telephone in the lower part of the body of the main module between holding plates of the mobile telephone. The speaker is located within the upper part of the body of the main module, and a fixating bracket made of elastic material is attached to the top of each of the discs of the holder of the mobile telephone.

The disadvantage of the prototype is the poor functional features of the device, associated with the unstable fixation of the mobile phones of differing construction and sizes, and the high possibility that they will fall out of the holder at the occurrence of vibrations, for example, as in a moving car.

BRIEF SUMMARY OF THE INVENTION

The task solved by this present invention is to improve the functional features of the universal hands-free unit for mobile phones.

This task is solved by accomplishing the technical result of increasing the reliability of the fixation of the mobile telephone in the holder of the universal hands-free unit for mobile telephones.

This technical result is achieved in that the universal hands-free unit for mobile telephones has plates, and fixating brackets are attached to the surface of the plates. The hands-free unit contains the main module, in the body of which a speaker and control electronics are placed, as well as a holder for the mobile telephone, a microphone, an attachment module, and a changeable connection module for electrical connection of the control electronics with the electrical circuits of the mobile telephone. The holder of the mobile telephone is constructed in the form of two plates, oriented parallel to each other at a distance L with the possibility to change this distance by moving at least one plate relative to the other plate using a mechanism located in the body of the main module. The main module has a shape elongated along the axis of the mobile telephone and a frontal surface with a flat area next to the attachment point of the mobile telephone in the lower part of the body of the main module between holding plates of the mobile telephone. The speaker is located within the upper part of the body of the main module. The fixating bracket attached to each holding plate is made in the shape of a base with several parallel resilient fins, positioned at an angle $\alpha$ with respect to the base and at an angle $\beta$ to the surface of the flat area of the body of the main module. Angles $\alpha$ and $\beta$ satisfy the condition that: $80°<\alpha<90°$ and $80°<\beta<90°$, and distance L satisfies condition that $S<L<S+2H$, where S is the width of the body of the mobile telephone, and H is the minimal height of the fixating bracket.

Additionally, in an invented universal hands-free unit for mobile telephones, the height of the resilient fins of the fixating brackets may be decreased in the direction of the flat area of the body of the main module.

Additionally, in an invented universal hands-free unit for mobile telephones, the height of the resilient fins of the fixating brackets may be decreased in the direction of the top part of the body of the main module.

BRIEF DESCRIPTION OF THE SEVERAL VIEWS OF THE DRAWING(S)

The essence of the invention is shown in the drawing FIGS. 1-5. Of the drawings:

FIG. 1 shows the general view of a claimed universal hands-free unit for mobile telephones.

FIG. 2 gives a view of a speaker with a mobile phone attached.

DETAILED DESCRIPTION OF THE INVENTION

Figure 1:
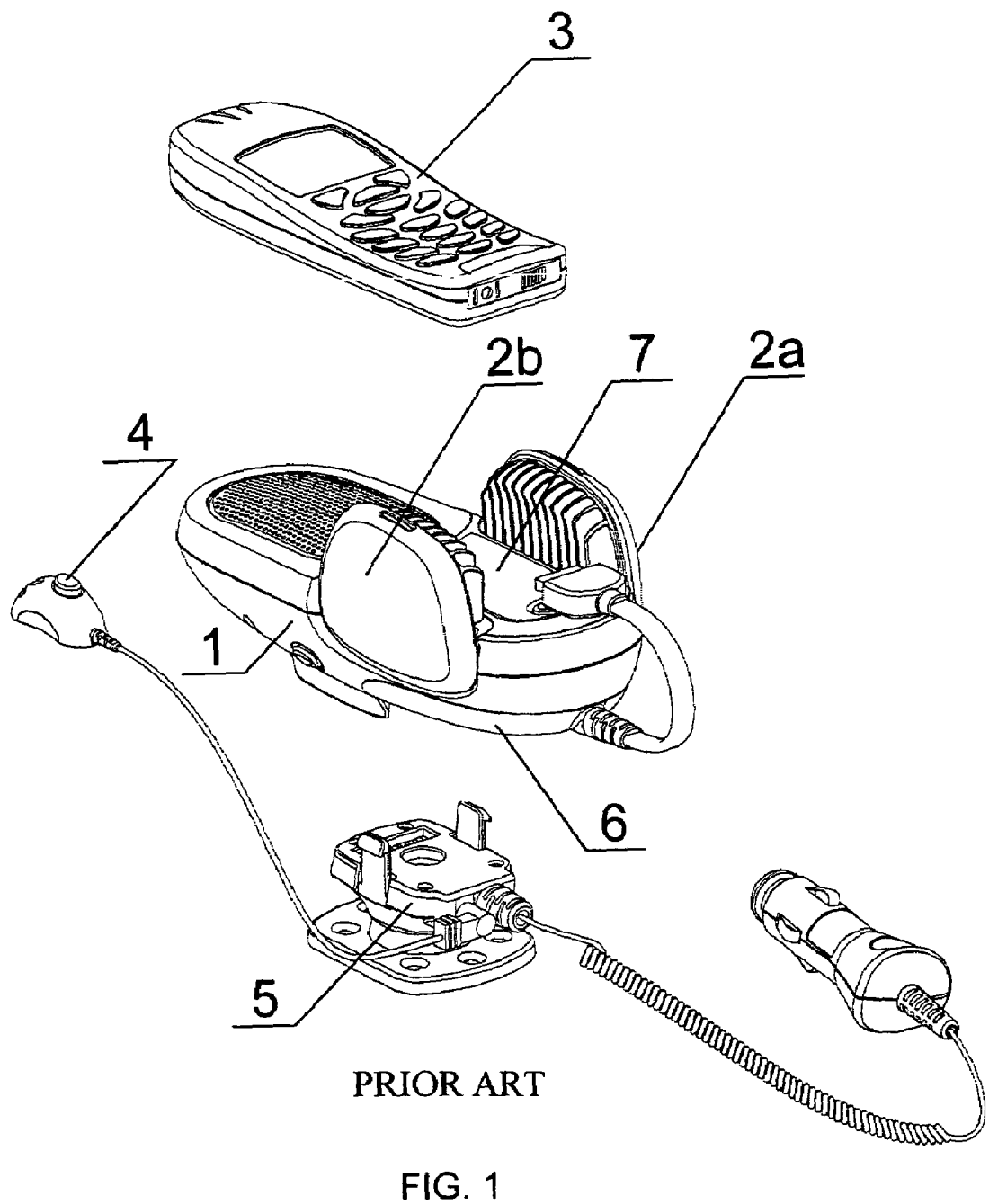

Comfortable usage of a mobile telephone in a vehicle with a hands-free unit requires positioning of the mobile telephone in the inside of the car in such a way that the driver may easily and freely install and plug in the mobile phone to the hands-free unit while getting into the vehicle and unplug and remove the phone while exiting the vehicle. During movement of the vehicle, the driver must be certain that the mobile telephone is firmly fastened and not in danger of falling during transport, when an unevenness of the road and other factors cause vibrations in the car. In this way, the task of reliable positioning of the mobile phone inside the car calls for a balanced solution: on the one hand, the driver must easily be able to place the mobile phone into the holder as well as remove it from there, and, on the other hand, the vibrations of the car must not lead to the mobile phone slipping out of the holder. Since the body of the mobile phone is, as a rule, made of plastic and does not allow excessive force during its fixation, the technical implementation of reliable fastening of the mobile telephone in the holder must be based on the use of resilient elements and elements made with soft materials, which are held in immediate mechanical contact with the mobile telephone during its time in the holder.

If the hands-free unit is designed for use with a broad range of models of mobile phones of various brands and can therefore be considered "universal", its electronics must be compatible with the electronic circuits of various mobile telephones, at least for the purpose of accepting and sending electrical signals responsible for the transfer of acoustic information between the driver and the other participants of the conversation and of recharging the batteries of the mobile phone during its operation within the hands-free unit. The holder of the mobile telephone in the speaker must allow at least rough regulation for adapting to the size of the body of the mobile telephone.

To solve the problem of firmly securing mobile telephones of arbitrary (within reasonable limits) sizes in the claimed speaker, a holder is, firstly, capable of adjusting the distance between fixation elements and, secondly, has a mechanism implementing the capability of easy placement and removal of the mobile telephone from the holder and not allowing it to slip out of the holder during vibrations of the car.

This invention is based on the known technical principle of overcoming instability caused by vibrations in detachable mechanical joints. It is known that even if the effect of the vibration on a detachable mechanical joint cannot be eliminated, the reliability of the connection may be increased if the direction of the movement of the detachable elements relative to each other is known beforehand. In this invention, the position of the body of the mobile telephone relative to the holder, as well as the direction of its movement under the influence of gravity are known beforehand.

In a claimed universal hands-free unit for mobile telephones, a fixating bracket is attached to the surface facing the opposite plate of each of the plates of the holder of the mobile telephone. The fixating bracket is made in the shape of a base with several parallel resilient fins positioned at angle $\alpha$ with respect to the base and at angle $\beta$ to the surface of the flat area of the body of the main module. Angles $\alpha$ and $\beta$ satisfy the condition that: $80°<\alpha<90°$ and $80°<\beta<90°$.

Figure 2:
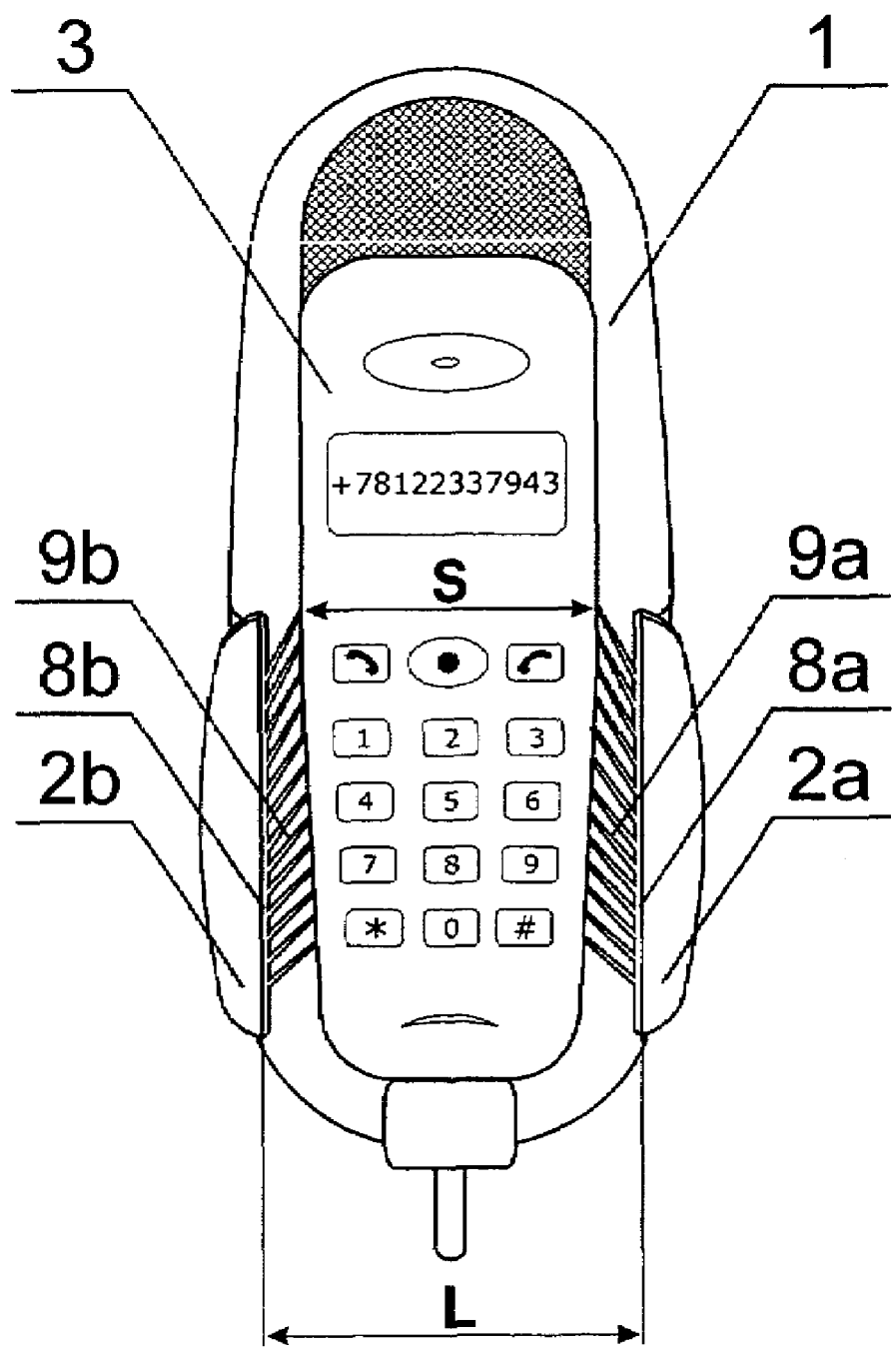
Figure 3:
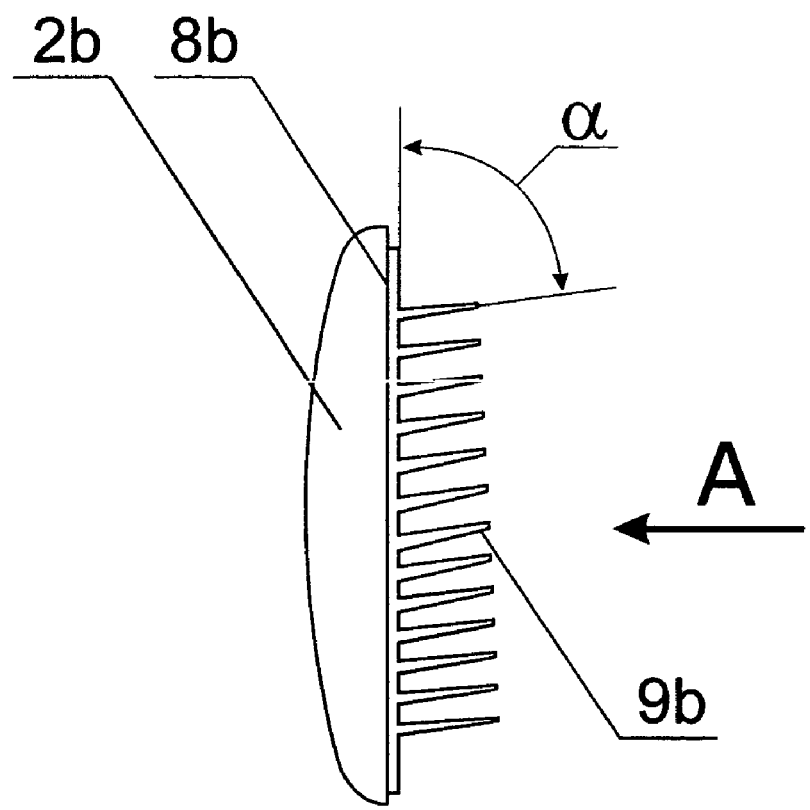
FIG. 3 shows two types of the holder plates of the mobile telephone with fixating brackets.
Figure 3:
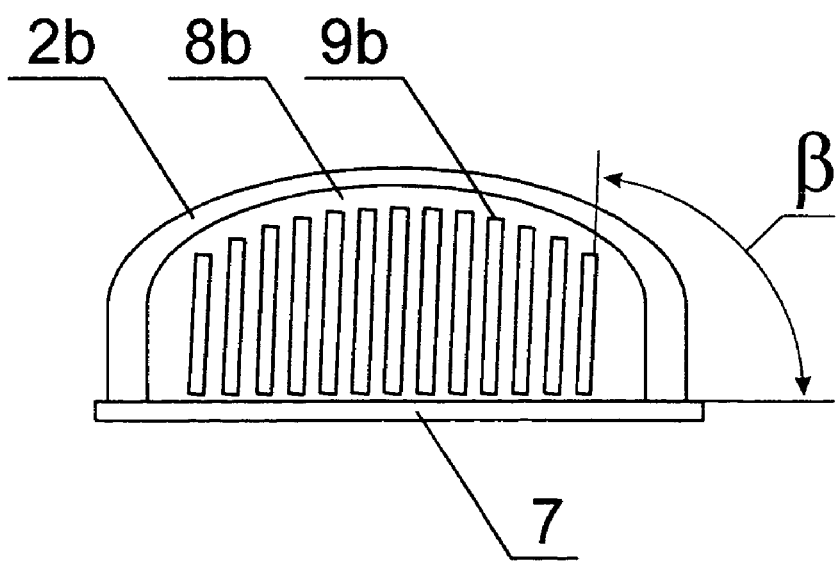

An embodiment of the invention, the general view of which is presented in FIG. 1, works in the following manner. The main module 1 with a holder 2a, 2b of the mobile telephone 3 and microphone 4 is installed in the interior of the car using the holding module 5. The electrical circuits of the mobile telephone 3 are attached to the control electronics of the hands-free unit with the help of an interchangeable connection module 6, the model of which is chosen based of the model of the mobile telephone 3. The mobile telephone 3 is placed on the flat plane 7 of the front surface of the main module 1 between the two plates, 2a and 2b, of the holder of the mobile telephone 3, each of which is equipped with fixating brackets on the base, 8a and 8b, respectively, with several parallel resilient fins 9a and 9b, respectively. Using the transfer mechanism located inside the body of the main module 1, the distance L is set between the holding discs 2a, 2b of the mobile telephone 3; L does not exceed the width of the body S of the mobile telephone 3 plus two times the minimal height H of its fixating brackets. The position of the mobile telephone 3 in the holder 2a, 2b is secured via the resilient deformation of the fins 9a and 9b of the fixating bracket. During the placement of the mobile telephone 3 in the holder 2a, 2b, the deformation of the fins 9a and 9b of the fixating bracket takes place as shown in FIG. 2. The position of the deformed fins 9a and 9b of the fixating brackets during the placement of the mobile telephone 3 into the holder 2a, 2b is determined by their original orientation relative to the bases 8a and 8b, respectively, and, in particular by that the resilient fins 9a and 9b, in their free non-deformed state, are positioned at angle α relative to the bases 8a and 8b, and at angle β relative to the surface of the plane 7 of the body of the main module 1, and that these angles are less than 90 degrees, but by no more than 10 degrees (see FIG. 3).

The construction of the fixating elements in the universal hands-free unit for mobile telephones provides the reliable fixation of the mobile telephone 3 despite vibrations during the movement of the car. During the vibrations under the gravity, the mobile telephone 3 positioned in the holder 2a, 2b can move only in the direction in which the deformation of fins 9a and 9b of the fixating brackets becomes larger. This, in turn, leads to an even greater increase in the strength of holding in the elastic material of the fixating brackets. At the same time, the tilt of the fins at angle α ensures the easy removal of the mobile telephone from its holder, and the tilt at angle β, easy insertion into the holder.

Figure 4:
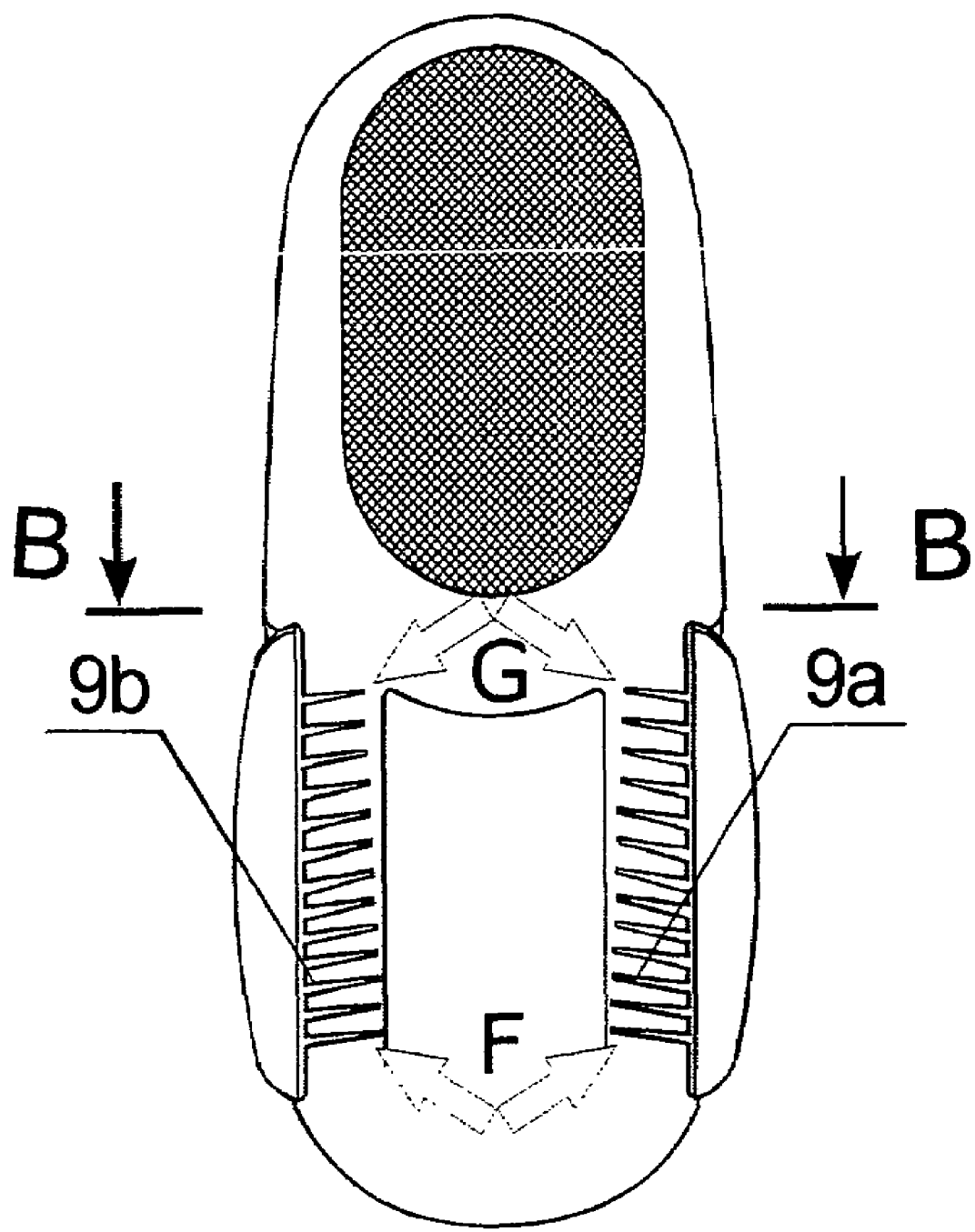
FIG. 4 shows one type of the main module with the holder of the mobile telephone.
Figure 5:
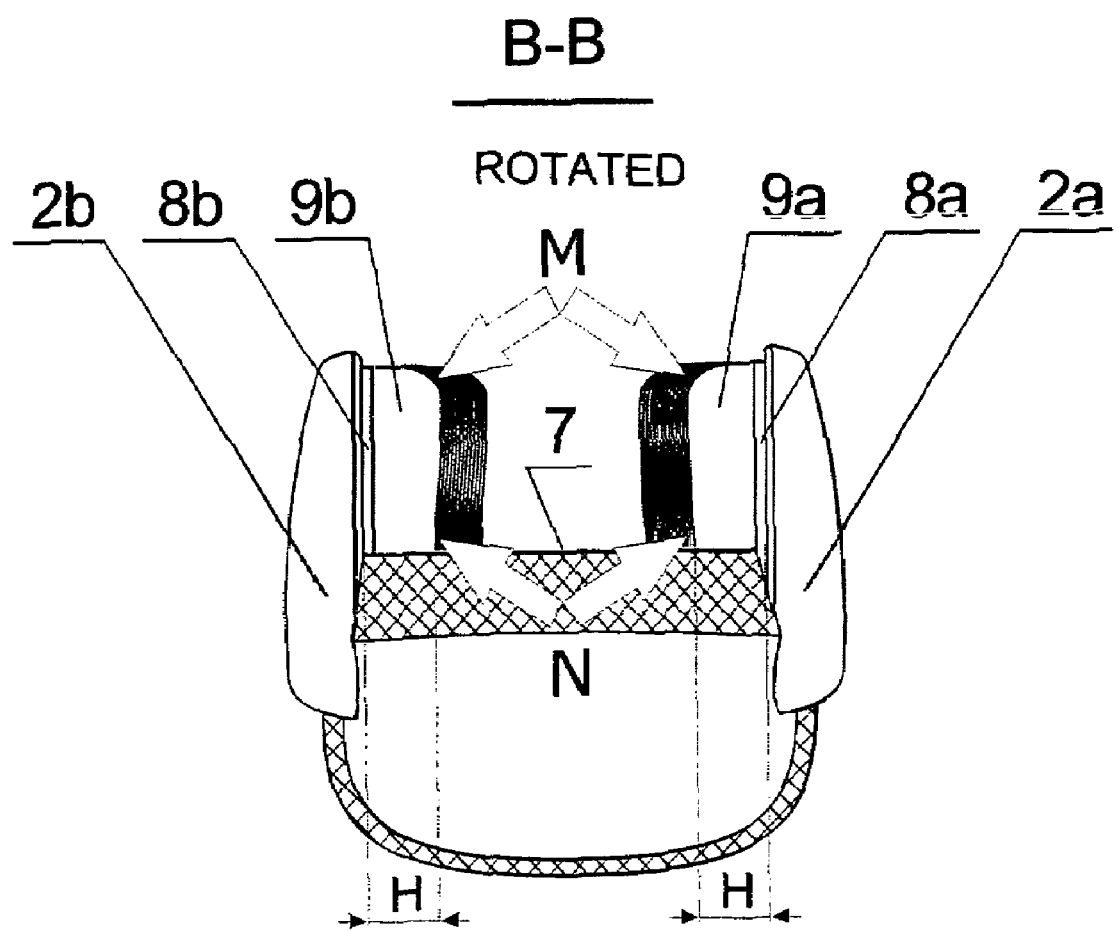
FIG. 5 shows another type of the main module with the holder of the mobile telephone.

Additional reliability of the fixation of the mobile telephone in the holder of the hands-free unit is provided by different heights of different fins 9a and 9b in two perpendicular directions. This feature uses information about the shapes of the bodies of mobile telephones, which, in most cases, are chosen by the manufacturers based on the comfort and ease with which the mobile telephone is held in a hand. Most models of mobile telephones have varying body widths. The body width in the area of the display window is usually slightly larger than the body width in the area of keyboard. The shape of these phones is usually either rectangular, or slightly narrowing in the direction from the display to the keyboard. Therefore, in some embodiments of this invention, the fixating brackets may have the heights of their resilient fins 9a and 9b gradually decrease in the direction of the top part of the body of the main module 1 (see FIG. 4, the resilient fins 9a and 9b of the fixating brackets have greater height in zone F than in zone G) and towards the flat surface 7 of the body of the main module 1 (see FIG. 5, the resilient fins 9a and 9b of the fixating brackets have greater height in zone M than in zone N). These constructional features provide additional reliability of the fixation of the mobile telephone in the holder of the claimed hands-free unit.

The claimed universal hands-free unit ensures high quality of functional characteristics by achieving the technological result, namely, higher reliability of fixating the mobile telephone in its holder.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A hands-free unit for a mobile telephone with a width S comprising
    a mobile phone holder, comprising
    two parallel plates separated by a distance L,
        L being greater than S,
    a main module elongated along the axis of the mobile telephone,
        the main module comprising
            a speaker positioned in the upper part of the main module,
            a front surface comprising
                a flat area in the lower part of the main module,
                    the flat area being located between the parallel plates,
                    the flat area being adjacent to a mobile phone attachment locus,
            control electronics, and
            a transference mechanism capable of changing L, two fixating brackets,
        each fixating bracket attached to a surface of a respective plate facing another plate,
        the height of each fixating bracket being at least H,
            H being greater than 0.5 multiplied by (L-S)
        each fixating bracket comprising
            a base and
            resilient fins parallel to each other,
                the resilient fins being positioned at an angle α to the base,
                    α being greater than 80° and less than 90°,
                the resilient fins being positioned at an angle β to the surface of the flat area of the
                front surface of the main module,
                    β being greater than 80° and less than 90°,
    a microphone,
    an attachment module, and
    a changeable connection module, the connection module being capable of coupling the control electronics with electric circuits of the mobile phone.

2. The hands-free unit of claim 1 wherein the height of each fixating bracket decreases in the direction towards the surface of the flat area in the lower part of the main module.

3. The hands-free unit of claim 1 wherein the height of each fixating bracket decreases in the direction towards the upper part of the main module.

* * * * *